US009900137B2

(12) United States Patent
Huang et al.

(10) Patent No.: US 9,900,137 B2
(45) Date of Patent: *Feb. 20, 2018

(54) DYNAMIC CHANNEL BONDING IN MULTICARRIER WIRELESS NETWORKS

(71) Applicant: Board of Trustees of Michigan State University, East Lansing, MI (US)

(72) Inventors: Pei Huang, Bellvale, WA (US); Xi Yang, East Lansing, MI (US); Li Xiao, Okemos, MI (US)

(73) Assignee: Board Of Trustees Of Michigan State University, East Lansing, MI (US)

( * ) Notice: Subject to any disclaimer, the term of this patent is extended or adjusted under 35 U.S.C. 154(b) by 50 days.

This patent is subject to a terminal disclaimer.

(21) Appl. No.: 14/905,133

(22) PCT Filed: Jul. 9, 2014

(86) PCT No.: PCT/US2014/045894

§ 371 (c)(1),
(2) Date: Jan. 14, 2016

(87) PCT Pub. No.: WO2015/009499

PCT Pub. Date: Jan. 22, 2015

(65) Prior Publication Data

US 2016/0149683 A1    May 26, 2016

Related U.S. Application Data

(60) Provisional application No. 61/847,219, filed on Jul. 17, 2013.

(51) Int. Cl.
*H04L 1/00* (2006.01)
*H04L 5/00* (2006.01)

(52) U.S. Cl.
CPC .................. *H04L 5/0053* (2013.01)

(58) Field of Classification Search
CPC ......... H04B 1/64; H04B 14/026; H04J 11/00; H04J 13/004; H04J 2011/0003;
(Continued)

(56) References Cited

U.S. PATENT DOCUMENTS

| 2006/0050625 | A1* | 3/2006 | Krasner | .................... | G01S 1/04 |
| | | | | | 370/208 |
| 2010/0165952 | A1* | 7/2010 | Sung | ........................ | H04L 5/026 |
| | | | | | 370/335 |
| 2010/0217789 | A1* | 8/2010 | Saitoh | ................... | H04L 9/0852 |
| | | | | | 708/255 |

OTHER PUBLICATIONS

No Time to Countdown: Migrating Backoff to the Frequency Domain by sen et al. Sep. 2011.*
(Continued)

*Primary Examiner* — Dady Chery
(74) *Attorney, Agent, or Firm* — Harness, Dickey & Pierce, PLC

(57) ABSTRACT

To address the inefficiency and unfairness issues in channel bonding, a dynamic channel bonding protocol is presented in which a node is allowed to start a transmission as long as a narrow channel is available and gradually increase channel width during transmission whenever a new narrow channel becomes available. The protocol aggregates all available narrow channels as one wide channel, removing the need of setting guard bands between contiguous narrow channels. A challenge in dynamic channel bonding is the communication over uncertain channels. To enable fast spectrum agreement between transmitter and receiver, a partial spectrum correlation method is introduced. When new channels become available, multiple nodes may contend for them. A compound preamble is designed to make collisions detectable in the frequency domain and a parallel bitwise arbitration mechanism is used to quickly resolve the collisions in the time domain.

17 Claims, 15 Drawing Sheets

(58) Field of Classification Search
CPC ....... H04J 2011/0006; H04J 2011/0009; H04J 2011/0013; H04J 2011/0016; H04J 2011/002; H04J 3/1676; H04L 5/0007; H04L 27/32; H04L 27/34
USPC ................ 370/203–211, 329, 334, 445–448; 455/512, 435.3, 509, 450
See application file for complete search history.

(56) References Cited

OTHER PUBLICATIONS

Pei Huang et al.: "WiFi-BA: Choosing arbitration over backoff in high speed multicarrier wireless networks", INFOCOM 2013 Proceedings IEEE, IEEE, Apr. 14, 2013 (Apr. 14, 2013), pp. 1375-1383, XP032440890, DOI: 10.1109/INFOCOM.2013.6566931; ISBN: 978-1-4673-5944-3, Figures 1-3, Sections II, III, V, VI.

* cited by examiner

DYNAMIC CHANNEL BONDING IN MULTICARRIER WIRELESS NETWORKS

CROSS-REFERENCE TO RELATED APPLICATIONS

This application is a 371 U.S. National Phase of PCT/US2014/045894, filed on Jul. 9, 2014 and published in English as WO 2015/009499 A1 on Jan. 22, 2015, which claims priority to U.S. Provisional Patent Application Ser. No. 61/847,219, filed on Jul. 17, 2013, both of which are incorporated by reference herein.

FIELD

The present disclosure relates to dynamic channel bonding in a multicarrier wireless network

BACKGROUND

Applications such as video conferencing and multimedia streaming demand low-lag gigabit speeds. To support high speed wireless communication, 802.11 standards are being driven to improve channel bonding, an efficient method that increases data rate regardless of other technologies in use. However, inefficiency and unfairness issues arise when heterogeneous radios coexist in a contention domain. When a device operates in a wide channel that spans across multiple narrow channels, it has to defer its transmission to the time when all of the narrow channels are vacant. This is inefficient because the device cannot utilize the other narrow channels when only one narrow channel is occupied. Further, when there are narrow channel devices in more than one narrow channel, the devices that use channel bonding are harder to win media access opportunities because narrow channel devices may work independently in the non-overlapping narrow channels.

A natural solution is to revert to narrow channel operations. A recent work introduces a compound radio design that splits a wide channel into multiple narrow channels and uses them independently. The strategy is efficient when a device has small packets to multiple devices. However, when a device has a bulk of data to one receiver, it is more efficient to use multiple split narrow channels as one wide channel to increase spectral efficiency by removing the guard bands between contiguous narrow channels. Although this approach narrows the guard bands with sharp filters, signal spreading introduced by a sharp filter will increase the inter symbol interference (ISI). Addressing the ISI requires a tradeoff between spectral efficiency and capability of tolerating frequency offset.

The inefficiency and unfairness issues can be alleviated if a device does not need to wait for all narrow channels to be idle to initiate a transmission. Recent spectrum-agile designs have shown that it is practical to aggregate noncontiguous narrow channels as one channel. The flexibility of spectrum use is thus comparable to the approach noted above. However, current spectrum-agile designs are frame-based. Therefore, when a new channel becomes available, it cannot be utilized until the next frame. An unfairness issue arises as not all nodes get contention opportunities for the new channel. The new channel is invisible to nodes that are in transmission. Some nodes may never be able to acquire the channel.

Current spectrum-agile designs are also lack of an efficient mechanism to address the multiple access issue. When a narrow channel becomes available, several nodes may attempt to acquire it at the same time. Leaving contention resolution to the carrier sense multiple access with collision avoidance (CSMA/CA) may require a large contention window to reduce collisions. The high overhead is hard to cut because low collision probabilities are desired. A transmission may fail even when two nodes have a collision only in a small fraction of used spectrum.

After a transmitter has won some narrow channels, it needs to inform the receiver of the used spectrum; otherwise, the receiver is unable to decode packets sent by the transmitter. Using control packets to achieve spectrum agreement can introduce high overhead because of medium access contention and physical layer convergence procedure. A better spectrum agreement method is desired.

To address the inefficiency and unfairness issues in channel bonding, this disclosure introduces a dynamic channel bonding (DyB) protocol in which a node is allowed to initiate a transmission as long as there exist some idle narrow channels and the node gradually increases channel width during transmission when new narrow channels are sensed to be idle. The design imposes three challenges.

First, when some narrow channels become idle, the medium access contention is severe because a transmitter has to contend with nodes that are within the same band of spectrum and nodes whose spectrum is partially overlapped with its spectrum. Even if two nodes collide only in a small fraction of the used spectrum, their transmissions may fail. Therefore, it is critical to address the contention issue in wide band spectrum sharing, which is the key to ensure that nodes will benefit from channel bonding. In this paper, a compound preamble is designed to probe collisions in all channels at the same time and a parallel bitwise arbitration mechanism is introduced to resolve the collisions. Nodes are allowed to contend for different channels simultaneously with different priorities. A node is unlikely to lose all channels in a contention.

Second, dynamic channel bonding aggregates all narrow channels obtained by a transmitter as one wide channel. A challenge is the communication over uncertain channel combinations. If the receiver is unaware of the channels used by the transmitter, the receiver cannot decode any packet sent by the transmitter. To achieve spectrum agreement between transmitter and receiver, we design partial spectrum correlation that encodes the receiver's unique signature in the frequency domain in all channels used by the transmitter. The receiver calculates the expected results when its signature is present in each channel. Through correlating received signal with all expected results, the receiver is able to identify channels used by the transmitter. Although there are n expected results when the target wide band is divided into n narrow channels, the searching for the signature in all channels is parallelized.

Third, the transmitter was unable to monitor the media state while it is transmitting. Therefore, current designs are frame-based. Each frame will use the available spectrum fragments detected before transmission. This raises an unfairness issue for sharing channels. Because a node cannot contend for a channel that becomes available during transmission, the channel may be acquired by another node. It is possible that channels used by two nodes are never available to each other because their contentions are not synchronized. With advances in self-interference cancellation, it becomes feasible to detect new spectrum availability even during transmission without using another antenna. This allows dynamic channel bonding to break the frame-based structure, changing spectrum use during transmission.

This disclosure addresses the aforementioned challenges with a dynamic channel bonding method and integrates all components as a complete system. This section provides background information related to the present disclosure which is not necessarily prior art.

SUMMARY

This section provides a general summary of the disclosure, and is not a comprehensive disclosure of its full scope or all of its features.

A dynamic channel bonding method is presented for use in a multicarrier wireless network. The method include: determining whether channels in a plurality of channels of a shared transmission medium are available for transmission, where each channel of the plurality of channels is divided into a plurality of subcarrier frequencies; transmitting a collision probe in each available channel of the plurality of channels, where the collision probe is derived from a binary codeword of k bits and each bit of the binary codeword is transmitted using a different subcarrier of the channel; detecting a collision on available channels based on presence of a signal on a subcarrier frequency of the available channel whose corresponding bit value in the collision probe is zero; arbitrating access to a given available channel in response to detecting a collision on the given available channel; transmitting data over the given available channel; and repeating these steps while transmitting data over the given available channel.

In another aspect of this disclosure, the dynamic channel bonding method may include: determining a signature for an intended recipient device, where the signature is a unique pseudo-random sequence assigned to the intended recipient device; arbitrating access to a plurality of channels of a shared transmission medium available for transmission, where each channel of the plurality of channels is divided into a plurality of subcarrier frequencies; obtaining access to select channels of the plurality of channel as a result of arbitrating access to the plurality of channels; transmitting a signature for a recipient device by modulating subcarriers frequencies of the selected channels in the plurality of channels using bits of the signature while modulating subcarrier frequencies of unselected channels in the plurality of channels with zero.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
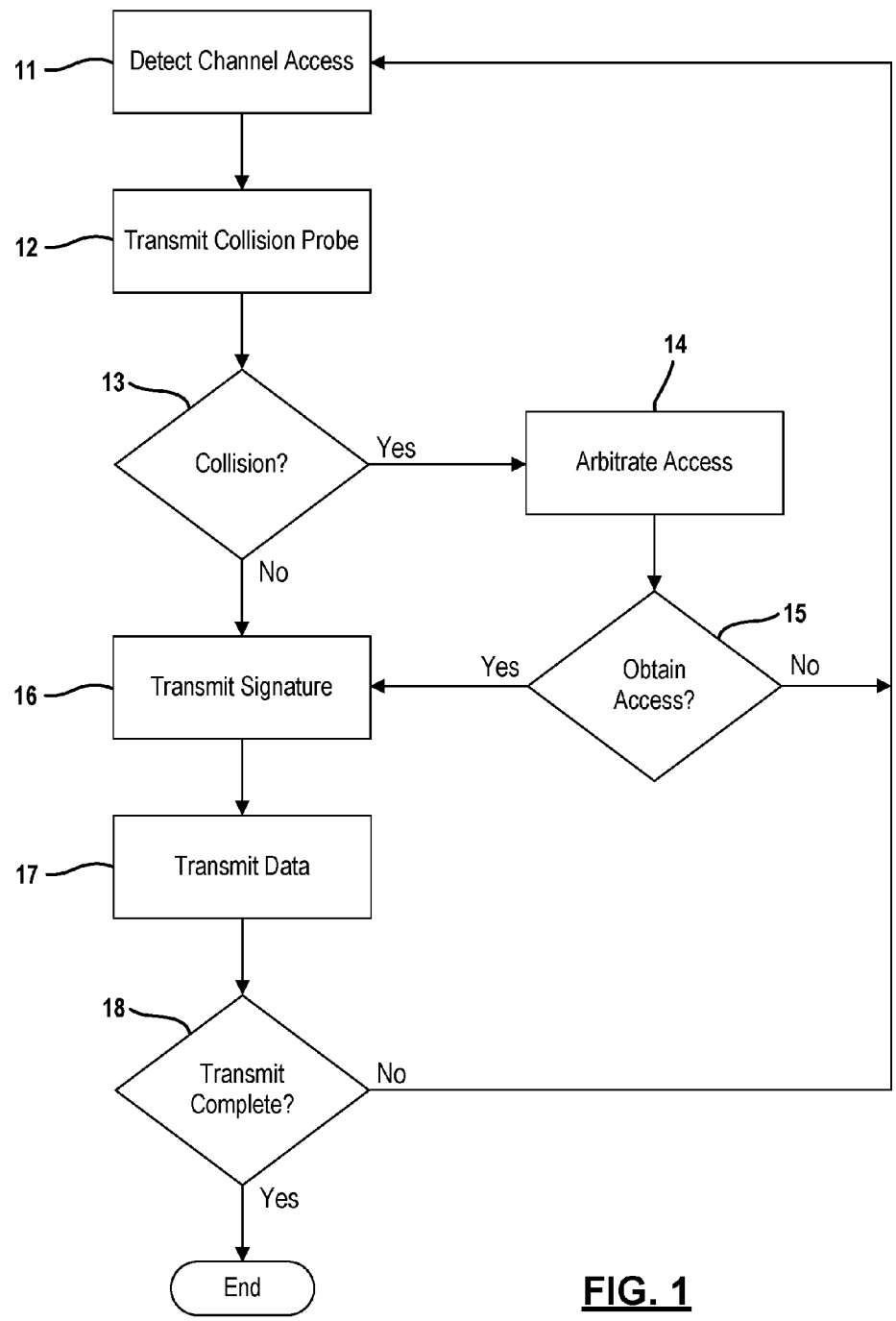
FIG. 1 is a flowchart depicting an overview of a dynamic channel bonding method.

FIG. 1 provides an overview of a dynamic channel bonding method in accordance with this disclosure. Assume that a wide band of spectrum is divided into n narrow channels of equal size for independent evaluation (e.g., 6 MHz channels in the TV bands). Before commencing a transmission, the transmitter checks at 11 what narrow channels are available in the target wide band. For example, a clear channel assessment (CCA) can be done through checking the power spectral density (PSD) of the wide band. Once available channels are identified, the transmitter needs to contend for these channels. Because there may exist many contending transmitters in a wide band of spectrum, medium access contention based on carrier sense multiple access with collision avoidance (CSMA/CA) may need a large contention window (CW) to ensure low collision probabilities. However, a large contention window leads to a long average backoff time, significantly reducing the efficiency.

When a channel is deemed to be available (i.e., idle), the transmitter can start transmission immediately. Transmission begins by transmitting a collision probe at 12 to detect for collisions. A collision probe is transmitted on each available channel. While a node is transmitting the collision probe, it is also concurrently listening on each available channel. A collision on an available channel is detected at 13 based on the presence of a signal on a subcarrier frequency of the available channel whose corresponding bit value in the collision probe is zero as further described below.

When multiple nodes have data to transmit, it is possible that two or more nodes detect a clear channel and transmit collision probes concurrently. In this scenario, the nodes will detect a collision and proceed with an arbitration mechanism at 14. A parallel bitwise arbitration is used to reduce the medium access overhead. The bitwise arbitration also allows a node to contend for different channels with different priorities. A node is unlikely to lose all channels during arbitration.

After a transmitter wins some channels, it needs to inform the intended receiver of the occupied channels; otherwise, the receiver is unable to decode packets sent by the transmitter. To achieve fast spectrum agreement between transmitter and receiver, partial spectrum correlation is employed as indicated at 16. With the partial spectrum correlation, the receiver is able to identify channels used by the transmitter and filter out unwanted signals in other channels, allowing the receiver to restore standard preamble detection on clean signal from the transmitter. Lastly, the transmitter begins transmission of its data to the intended receiver at 17.

Once a node starts transmitting, it can continue to monitor channel in the network to determine availability as indicated at 18. In some embodiments, the node may employ more than one antenna. In other embodiments, monitoring can take place using the same antenna being used for transmission. Recent advances in self-interference cancellation show that new radio designs will allow simultaneous transmission and reception even with the same antenna. Therefore, a transmitter can monitor the medium state even when it is transmitting. This allows all nodes to perceive a newly available channel. All nodes get equal chances to acquire the new channel. The contention is resolved through bitwise arbitration. The winner piggy-backs the new spectrum use via data to inform the receiver of increased channel width and then bonds more channels for subsequent data transmission. The process may be repeated until the transmission is complete. Each aspect of this method is further described below.

Figure 2:
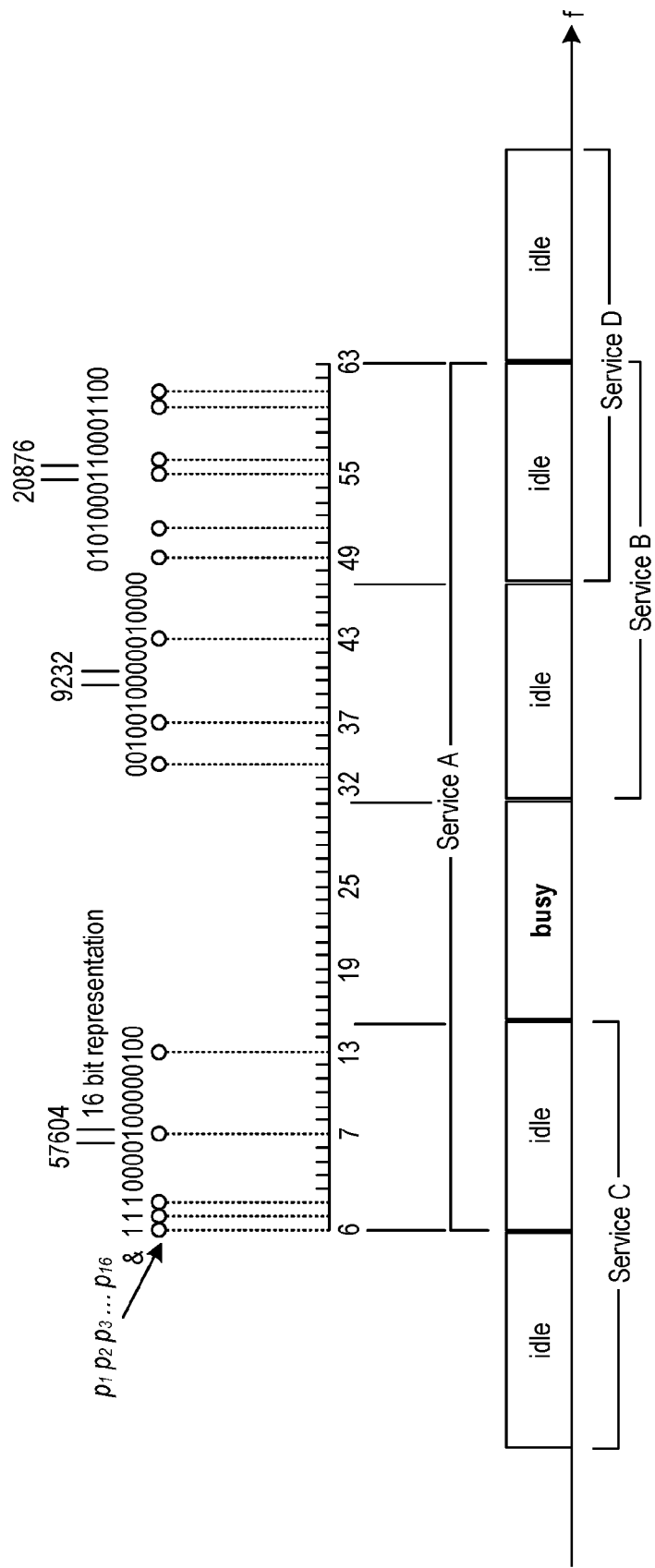
FIG. 2 is a diagram of binary code mapping with NC-OFDM for collision detection.

Dynamic channel bonding employs OFDM to opportunistically utilize spectrum fragments in a wide band of spectrum. Besides contending transmitters in the same band of spectrum, there are transmitters contending for partially overlapped spectrum as shown in FIG. 2 (different services may choose different center frequencies and bandwidths). A collision in a small fraction of the used spectrum may cause the entire transmission to fail. The cost is high and thus a large contention window may be needed in CSMA/CA to reduce the collision probability. However, using a large contention window increases the average backoff time. The bitwise arbitration mechanism introduced here provides low collision probabilities with low overhead.

The bitwise arbitration relies on collision detection. When a node has data to send, it first checks what channels are available. It then transmits a compound preamble that occupies all of the channels but the preamble is designed to set some subcarriers to inactive as shown in FIG. 2. First, some channels are busy, hence all subcarriers in those channels are set to inactive. Second, some subcarrier are intentionally deactivates in available channels for collision detection. Further details regarding this mechanism are also found in U.S. application Ser. No. 13/803,758 entitled Collision Detection and Bitwise Arbitration in Multicarrier Wireless Networks which is incorporated in its entirety by reference.

OFDM employs inverse fast Fourier transform (IFFT) to efficiently modulate multiple orthogonal subcarriers at the same time. A bit stream is first transformed into a stream of modulation symbols (e.g., 1+0i, −1+0i when BPSK is used). The stream of modulation symbols is divided into vectors of N modulation symbols. These vectors are inputted to an N-point IFFT algorithm one by one. The IFFT algorithm returns the inverse discrete Fourier transform (DFT) of each vector, which consists of N samples. The N samples are referred to as one OFDM symbol in the time domain. The receiver can recover the modulation symbols through performing FFT on the received OFDM symbol.

To deactivate some subcarriers, zero is fed into the IFFT algorithm instead of modulation symbols. In a vector of N modulation symbols, the ith symbol is used to modulate the ith subcarrier. If the ith symbol is replaced with 0, this leads to zero power at the ith subcarrier. Therefore, to deactivate M out of N subcarriers, N−M symbols are taken from the stream of modulation symbols and mapped to active subcarriers. Other values in the vector are set to 0. In this way, select subcarriers can be deactivated.

In the frequency domain, a compound preamble occupies the entire wide band with some subcarriers set to inactive as shown in FIG. 2. In the time domain, a compound preamble is one OFDM symbol that consists of N samples when an N-point IFFT is used. Suppose the target wide band is composed of n narrow channels. Each channel contains k=N/n subcarriers. A unique sequence of k symbols $\{p_1\ p_2\ p_3\ \ldots\ p_k\}$ is assigned to each node. For collision detection, the actual sequence is of no meaning. Thus, the discussion about the sequence is postponed to spectrum agreement below.

If a node repeats its unique sequence by n times (k×n=N symbols) and performs N-point IFFT, it generates a compound preamble that causes high magnitudes at all N subcarriers. To deactivate some subcarriers for collision detection, a node draws a random number from a uniform distribution over the interval $(0,2^k)$ for each available channel. For busy channels, the number 0 is used. Because each number can be represented by a k bit binary code, the binary code is bitwise AND with the node's unique sequence. As some 0s are fed to the IFFT, not all subcarriers in each available channel are used and all subcarriers in busy channels are set to inactive as shown in FIG. 2. The binary representation of each number is essentially a map of active and inactive subcarriers in the corresponding channel with '1' indicating active and '0' indicating inactive.

With compound preamble design, a collision is detectable if a node observes high magnitudes at subcarriers that are deactivated by it. The collision detection fails only when two nodes choose the same random number, but the probability is very low as it decreases exponentially along with the increased subcarrier number k. For example, assuming a 64-point IFFT is performed on a 20 MHz band that comprises four 5 MHz channels, each channel contains 16 subcarriers. With the binary mapping, in total $2^{16}-1$ random numbers can be represented (0 is excluded) in each channel. The probability that two nodes choose the same number for a channel is very low. To get the same low collision probability in CSMA/CA, the contention window (CW) will be too large to be practical.

Because collisions are detectable in the frequency domain, instead of deferring nodes' transmissions randomly for collision avoidance, a node is permitted to transmit immediately when some channels are identified as idle. To check whether the bold attempt will cause a collision, a node performs spectrum analysis on a received signal while it is transmitting its compound preamble.

In some embodiments, the simultaneous transmission and reception relies on recent advances in self-interference cancellation. Commercially used 14-bit ADCs have 86 dB of dynamic range where the dynamic range is calculated as DR(dB)=6.02×n+1.76 dB for n=14. The dynamic range defines the ratio between the highest and the lowest detectable signal power. Considering a typical thermal noise floor −95 dBm for Wi-Fi systems, the self-interference cannot be over −9 dBm; otherwise, weak signals from other transmitters cannot be preserved in sampling. However, the highest transmission power on a Wi-Fi 2.4 GHz antenna can be around 30 dBm, which is strong enough to bury other weak signals. This is why duplex wireless communication was impossible in the past without two antennas.

Figure 3:
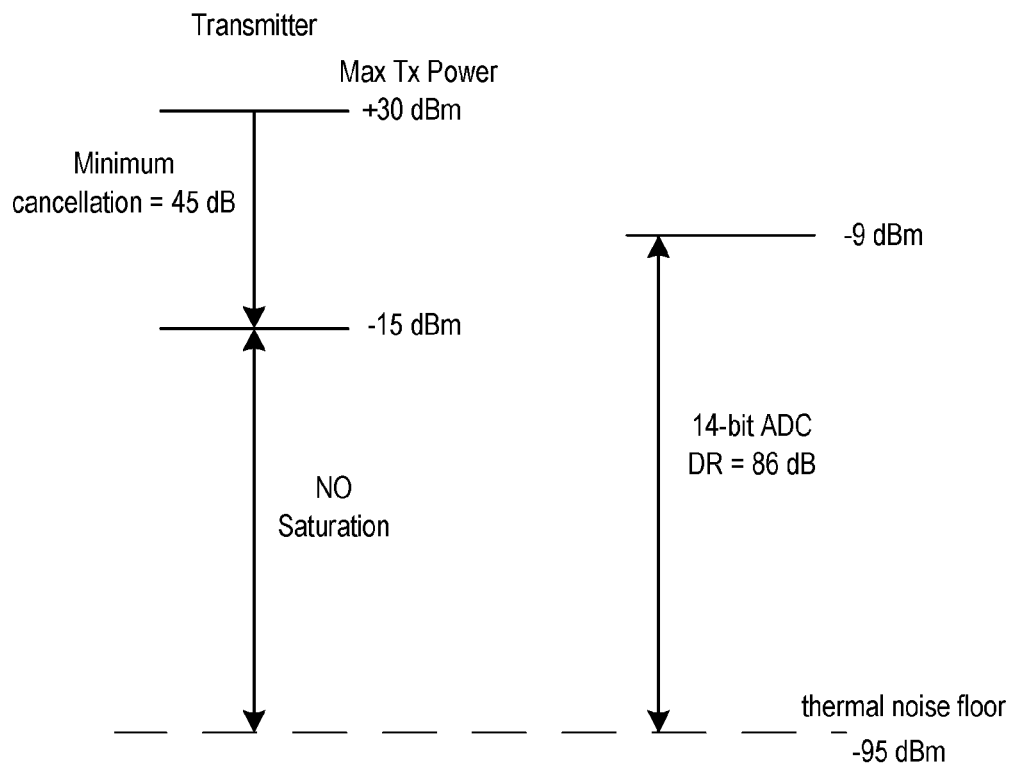
FIG. 3 illustrates that self-interference cancellation is sufficient to prevent ADC saturation.

Recent studies in self-interference cancellation have reached at least 45 dB cancellation in practice. As shown in FIG. 3, the self-interference cancellation is sufficient to prevent ADC saturation. Although more self-interference cancellation is needed to enable simultaneous transmission and reception of packets in the same spectrum slice, collision detection does not require such a perfect cancellation. In this design, each node sets some subcarriers to inactive, leading to zero power at these subcarriers. As long as the self-interference does not cause ADC saturation, a node can detect high magnitudes at inactive subcarriers if there is a collision. The collision detection does not incur additional cost of an additional antenna. To enable real full duplex wireless communication, transmitting antenna can be separate from the receiving antenna for more self-interference cancellation.

Figure 5:
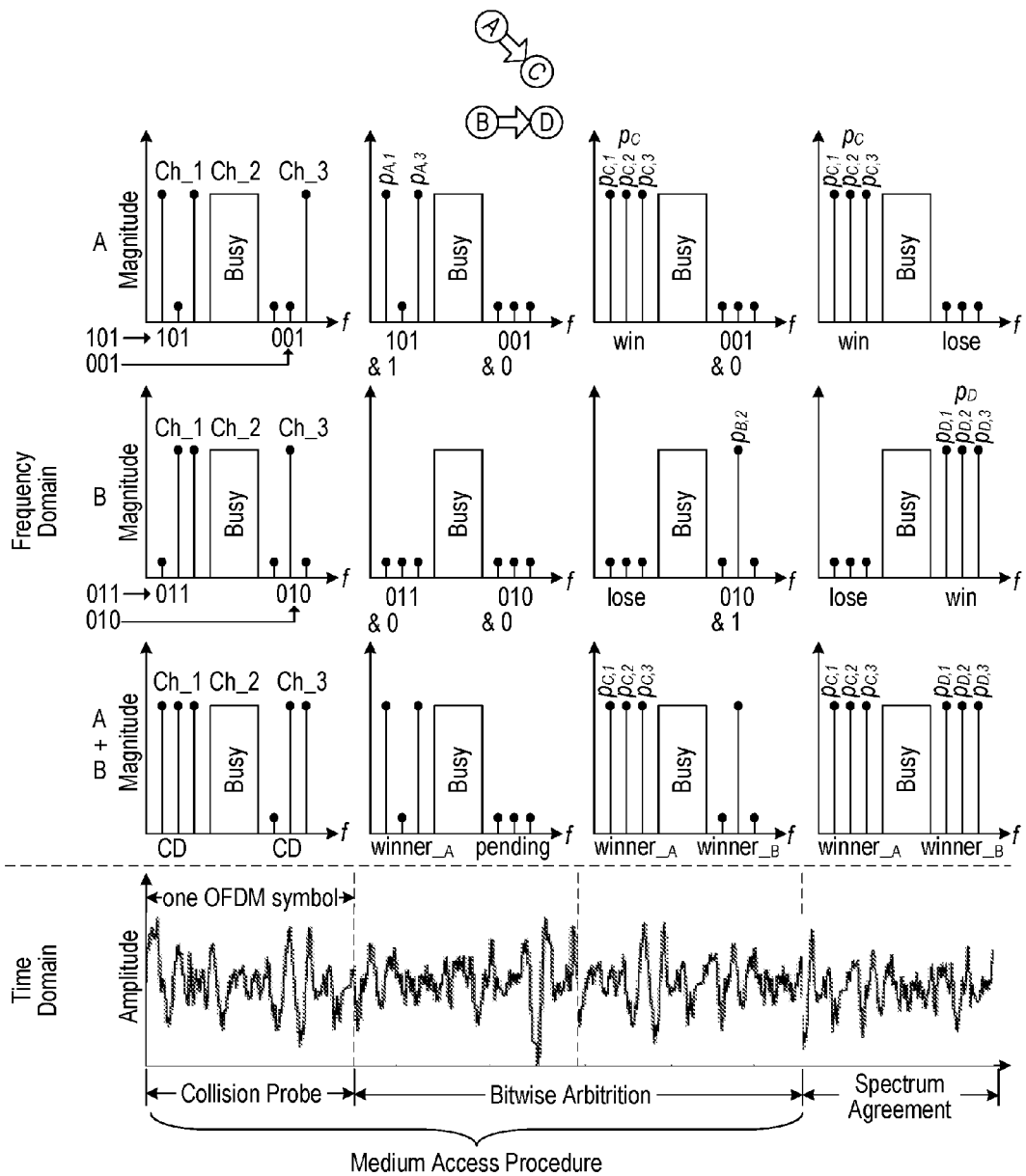
FIG. 5 is a diagram illustrating the initial three phases in dynamic channel bonding.

As collisions are detectable, it is important to determine which node is the winner of a particular narrow channel in a contention. FIG. 5 shows an overview of medium access procedure in the dynamic channel bonding method. There are two phases: collision probe and bitwise arbitration. When a node has data to send, it checks what channels are available. Once the CCA is done, the node transmits its first compound preamble to check whether there is a collision in any of the contending channels. This phase is referred to as collision probe.

If there is no collision in a channel, the node wins the channel immediately. It then uses all subcarriers in the channel for the destination's unique sequence, which will be discussed soon. If there is no collision in all contending channels, the bitwise arbitration is skipped. However, if there is a collision in any of the channels, the bitwise arbitration is triggered.

Figure 4:
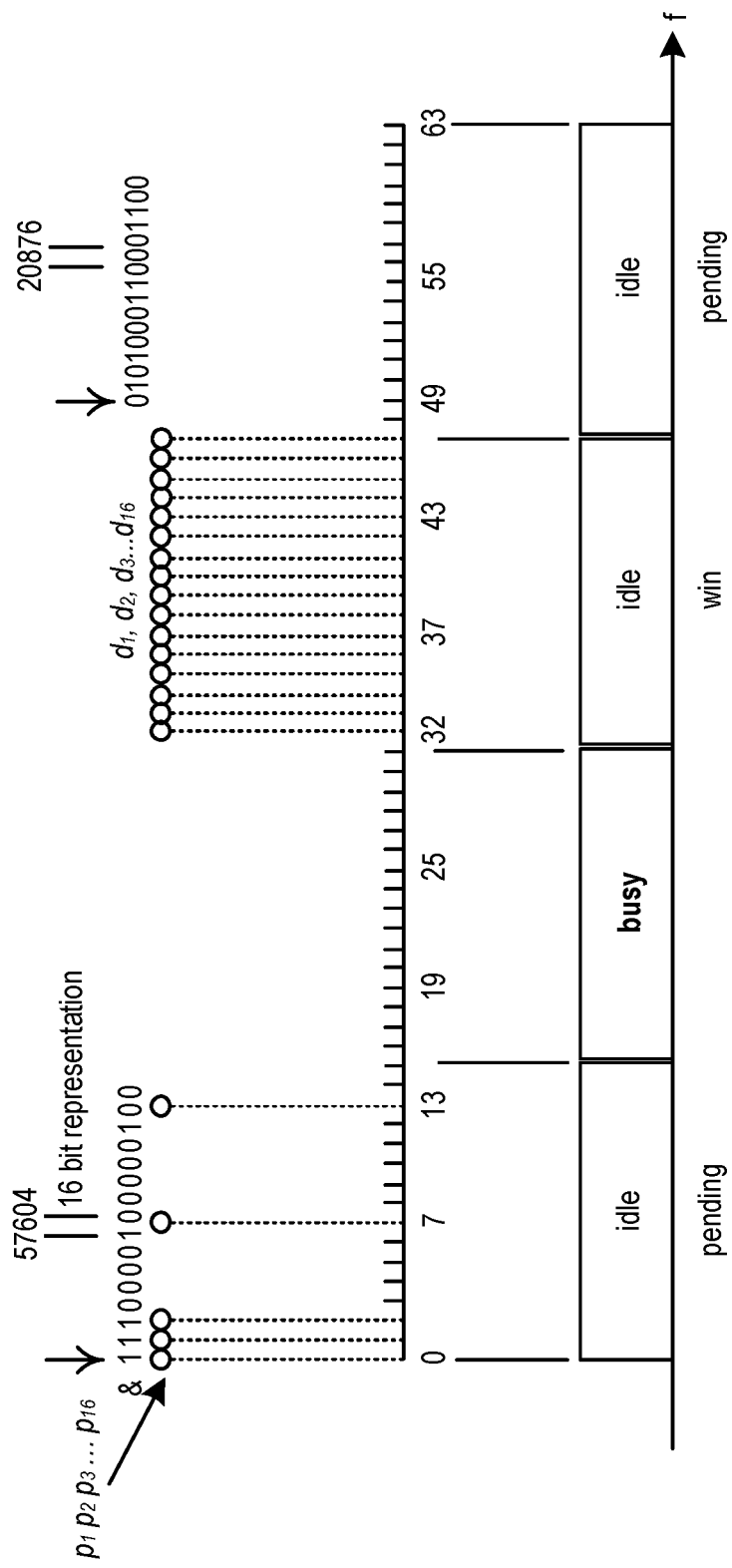
FIG. 4 is a diagram depicting an example of the first compound preamble in the arbitration phase.

In the bitwise arbitration phase, the compound preamble of a node is updated to consider three conditions as shown in FIG. 4. First, for busy channels, all subcarriers are set to inactive. Second, for a channel that is won by the node, the destination's unique sequence is mapped to all subcarriers. Third, for a channel in which the winner has not been determined, the ith bit of the corresponding binary code is checked for constructing the ith compound preamble in the bitwise arbitration phase.

The compound preamble is used to contend for multiple channels at the same time. For any channel, a node traverses the corresponding binary code starting from the most significant bit. If the ith bit is 0, all subcarriers in the channel are set to inactive in the ith compound preamble. If the ith bit is 1, the node maps its unique sequence to active subcarriers according to the binary code.

While a node is transmitting its compound preamble, it also performs spectrum analysis on received signal. If it sets all subcarriers in a channel to inactive but observes high magnitudes at subcarriers in the channel, it loses the channel. On the contrary, if the channel is idle, the winner has not been determined, it proceeds to check the next bit. If a node uses some subcarriers in a channel in a compound preamble and the collision still exists (detecting high magnitude at subcarriers that are deactivated by it), it proceeds to check the next bit. On the contrary, if the frequency spectrum of the channel matches its corresponding binary code, the collision has been resolved and the node wins the channel. Once a node wins a channel, all subcarriers in the channel are used for the destination's unique sequence. The node shall occupy the channel to prevent other nodes from taking it. When collisions in all channels are resolved, the node initiates the spectrum agreement.

The time length of a compound preamble is equivalent to one OFDM symbol, which contains N samples when an N-point IFFT algorithm is used. Meanwhile, the spectrum analysis needs N samples when an N-point FFT algorithm is used. The simultaneous transmission and reception of a compound preamble takes N/B seconds where B is the bandwidth. For example, assuming a 64 point IFFT/FFT algorithm is adopted, it takes 3.2 µs to complete the preamble transmission at 20 MHz. In the same 3.2 µs, the receiving chain completes the collection of 64 samples for the spectrum analysis.

FIG. 5 shows how bitwise arbitration gradually determines the winner of each channel. Although the example shows two nodes, the principle applies to any number of contending nodes.

Collided transmissions are implicitly synchronized by the collision. Nodes detect collisions in the 1st compound preamble. In the 2nd OFDM symbol, the compound preamble sent by a node is updated according to the first bit of each binary code. For node A, the first bit for channel 1 is 1. It occupies some subcarriers according to the binary code. On the other hand, the first bit of the binary code for channel 3 is 0. All subcarriers in channel 3 are set to inactive. Following the same principle, node B gets a binary map where all subcarriers are set to inactive because the first bit of either binary code is 0.

While node A and node B are transmitting the 2nd compound preamble, they also perform FFT on received signal. For channel 1, node A notices that there is no collision and thus it wins the channel. Node B notices that channel 1 is busy when it has no active subcarrier in the channel. It loses the channel. The arbitration for channel 1 is done. For channel 3, both nodes set all subcarriers to inactive and they detect an idle channel. The winner of channel 3 has not been determined. They must check the next bit to determine priority.

In the 3rd OFDM symbol, node A has won channel 1 and it uses all subcarriers in channel 1 for the destination's unique sequence. In channel 3, node A has no active subcarrier because the 2nd bit of the binary code is 0. Node B has lost channel 1. It sets all subcarriers in channel 1 to inactive. The 3rd compound preamble sent by node B occupies some subcarriers in channel 3 according to its binary code for channel 3. Since there is no collision, node B wins channel 3 and node A loses the channel.

The example shows that as long as two nodes do not choose the same binary code for a channel, the collision will be resolved within k OFDM symbols where k is the number of subcarriers used for channel access contention in a narrow channel. Note that the bitwise arbitration may end earlier without traversing all bits. Therefore, the overhead is upper bounded by k but most of the time it is lower.

Figure 20:
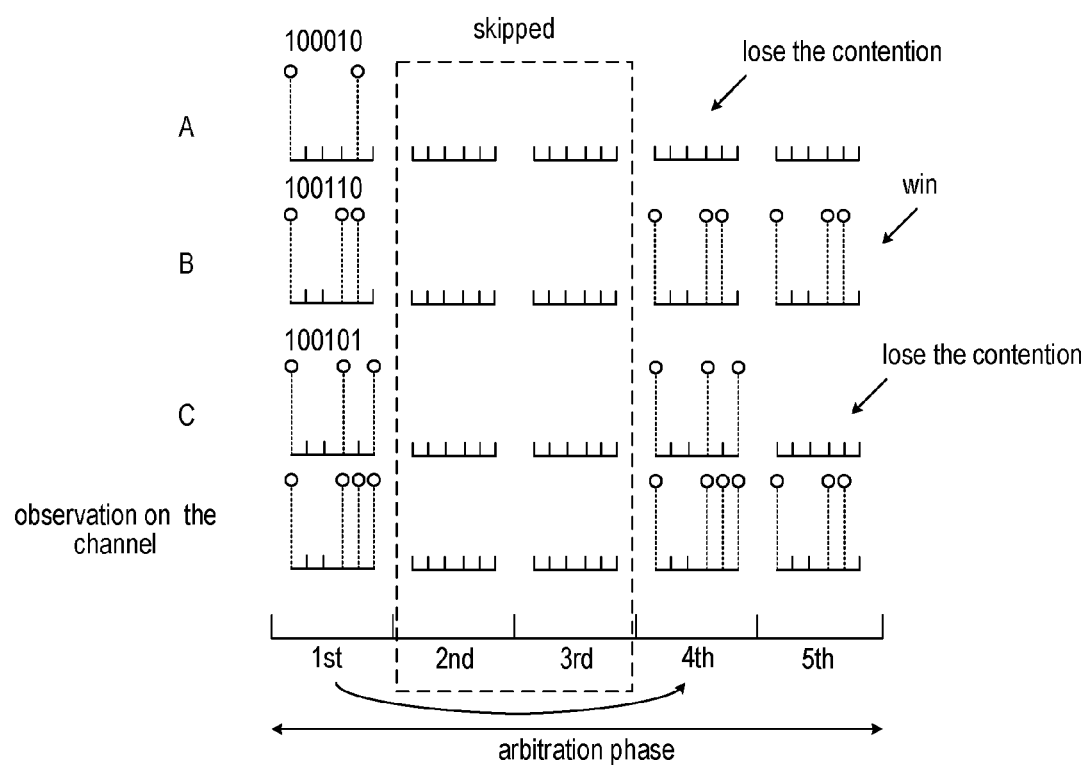
FIG. 20 is a diagram illustrating a technique to speed up arbitration.

FIG. 20 shows a technique to speed up arbitration. When a node observes that there is no high magnitude at the ith subcarrier in a narrow channel, it skips checking the ith bit of the corresponding random number. Originally, when a node detects a collision in a narrow channel, it checks the next bit to determine whether it should set all subcarriers to inactive. FIG. 20 shows that all three contending nodes set all subcarriers to in inactive in the $2^{nd}$ and $3^{rd}$ compound preamble because the $2^{nd}$ and the $3^{rd}$ bit of their random numbers are 0. The winner is selected in the $5^{th}$ compound preamble. However, all three contending nodes can observe that there is no high magnitude at the $2^{nd}$ and the $3^{rd}$ subcarrier in the $1^{st}$ compound preamble. Therefore, instead of checking the next bit, all nodes directly check the $4^{th}$ bit to construct the $2^{nd}$ compound preamble. In this way, the winner is selected in 3 compound preambles as shown in FIG. 20. Locating the next dominant bit position in the frequency domain helps to shorten the arbitration phase for an arbitrary channel.

Suppose a 256-point IFFT/FFT algorithm is used in a band of 40 MHz and the 40 MHz band is divided into four 10 MHz narrow channels. In the receiving chain, the FFT algorithm consumes 256 samples each time. It takes 256/40=6.4 μs to complete the collision detection for all of the four narrow channels at 40 MHz. A collision in a narrow channel cannot be detected if two nodes choose the same binary code, leading to a collision in the data transmission phase. However, the collision probability is low because of the binary mapping.

In practice, not all subcarriers can be used for spectrum contention due to power leakage. An active subcarrier may increase the magnitudes of neighboring subcarriers. In an example embodiment, one subcarrier in every six subcarriers is used to avoid mistaking an inactive subcarrier as active in collision detection. In the example, each narrow channel contains 64 subcarriers. The collision probability is as low as $C(n, 2)*1/(2^{[64/6]}-1)^2$ for two nodes choose the same random number. To obtain the same collision probability, a contention window $[0,2^{10}-2]$ is needed in CSMA/CA, leading to an average backoff time of $$\frac{2^{10}-2}{2} \times 9 \ \mu s = 4.599 \ ms$$

in 802.11n. However, the collision probe and bitwise arbitration is upper bounded by $(1+10)*6.4 \ \mu s=70.4 \ \mu s$, which is significantly lower than the random backoff. The bitwise arbitration provides low collision probabilities with low overhead, and it allows a node to contend for different channels with different priorities.

After the spectrum contention, a transmitter has won some narrow channels. However, the receiver is unable to decode any packet sent by the transmitter if the occupied spectrum is unknown. To achieve spectrum agreement, partial spectrum correlation is introduced.

In signal processing, cross-correlation can be used to measure the similarity of two waveforms. It is efficient in identifying the presence of a signal that is buried under noise. The transmitter can transmit a sequence of complex symbols that is known at the receiver. The receiver simply correlates the received signal with the known sequence. If a high correlation peak occurs, it means the known sequence is present in the received signal.

Figure 6:
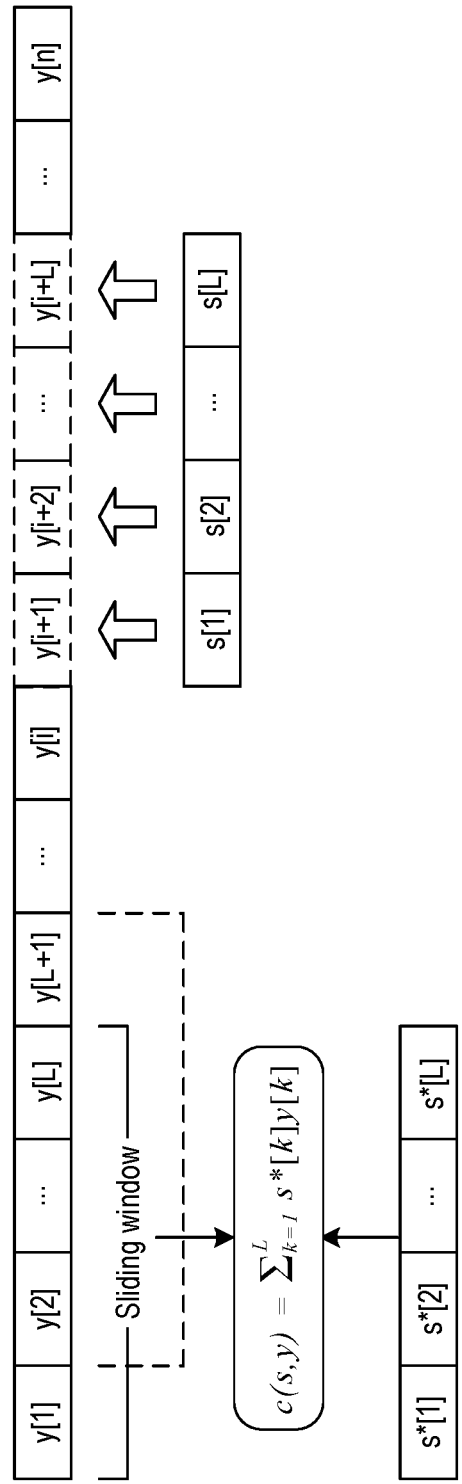
FIG. 6 is a diagram depicting time domain signal correlation.

The cross-correlation can be used as an in-band signaling. Let the transmitter transmit a known sequence s of length L. The receiver searches for the known sequence by correlating the received signal y with the known symbol sequence. The cross-correlation value $C(s, y)=\Sigma_{k=1}^{L}s^*[k]y[k]$ is low if s is not present in y where s* denotes the complex conjugate of the known sequence. The reason is that noises and other signals are supposed to be independent of s, and thus the similarity identified by the cross-correlation should be low. As shown in FIG. 6, the L samples of y are extracted by a sliding window. The cross-correlation value stays low until the sliding window is aligned with the s. When all samples of s are included in the sliding window, the highest correlation value $C(s, y)_{peak}=H\Sigma_{k=1}^{L}|s[k]|^2$ is achieved, where H is the channel impulse response.

When a node wins m channels out of n narrow channels, it may transmit the destination's unique sequence in the m channels. The receiver keeps correlating received signal in each of the n channels with its own unique sequence. If a high correlation value occurs, the receiver knows that a channel is used by a node to send data to it. The method, however, requires that each channel is isolated by multiple filters. In our design, all available channels are used as one channel, aiming at removing the guard bands, thereby exploiting the orthogonality between subcarriers in OFDM to remove the need of using sharp filters.

In a partial spectrum correlation scheme, each node has been assigned a unique sequence as its signature. The signature is known to its neighbors through neighbor discovery (routing also requires neighbor information). Such discovery mechanisms are known in the art.

To indicate channels that are used for the receiver, the transmitter encodes the receiver's signature in the frequency domain. A node maps the receiver's signature to subcarriers of each channel that is occupied by it. Suppose a narrow channel contains L subcarriers. A signature sequence of length L for each node is designed. A key feature of the signature is that a node's signature cannot result in high correlation values with other nodes' signatures. Some polyphase codes possess such correlation properties and the Zadoff-Chu (ZC) sequences are used as an example. Other sequences are also contemplated by this disclosure. The transmitter uses the signature of the receiver to modulate all L subcarriers in each obtained channel while in other channels it fees 0s to the corresponding subcarriers.

In OFDM, the multi-carrier modulation is efficiently accomplished through IFFT, which yields the sum of all modulated subcarriers. If the receiver is synchronized with the transmitter and knows the start of each OFDM symbol, the ZC sequence in each channel can be recovered by performing FFT on the right OFDM symbol. However, the receiver cannot be synchronized with the transmitter without knowing the occupied spectrum. The receiver generates the time domain signal by calculating the expected IFFT result when its signature is presented in a channel.

Figure 7:
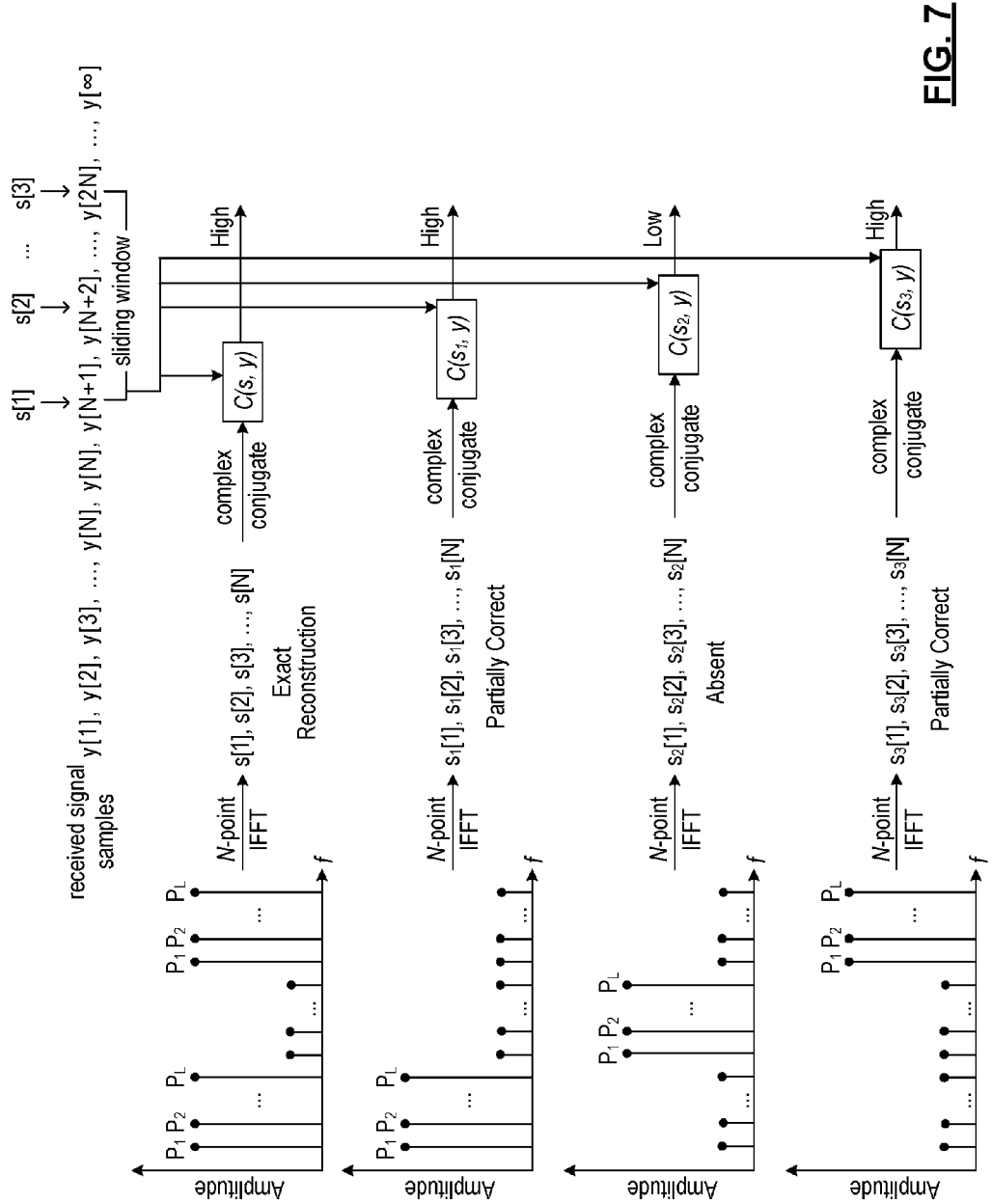
FIG. 7 is a diagram depicting cross-correlation of the received signal with expected IFFT results.

If the used channels are known, the receiver can construct the exactly same OFDM symbol generated by the transmitter. A high correlation value will be observed when the sliding window is aligned with the right OFDM symbol as shown in FIG. 7. However, the receiver does not know the channels acquired by the transmitter. Thus, the receiver calculates the expected IFFT results assuming its signature is present in each of the n channels. The receiver then correlates received signal with all expected IFFT results in parallel. When the sliding window is aligned with the right OFDM symbol, a correlation peak will be observed for each used channel but the value is 1/m of the correlation peak observed when all m channels are correctly used together to reconstruct the OFDM symbol. Therefore, we normalize the correlation value of the ith channel to $C(s_i, y)/\Sigma_{k=1}^{L}|s_i[k]|^2$. Experiments in performance evaluation show that when the signature is indeed present in a channel, correlating the received signal with the corresponding expected result will yield a high peak. Although the received signal is the sum of all modulated subcarriers, the orthogonality means that the cross-talk between subcarriers sums up to zero. With the partial spectrum correlation, the receiver can identify channels used by the transmitter.

Cross-correlation works without knowing the boundary of each OFDM symbol, but to decode a packet sent by the transmitter, the receiver must synchronize to the start of each OFDM symbol and estimate the frequency offset. Encoding synchronization preamble over non-contiguous bands imposes a challenge of preamble detection at the receiver. OFDM is designed to work in a contiguous band. The preamble detection is based on a time domain delayed correlation property embedded in the preamble. Because some narrow channels in the wide band are occupied by other transmissions, the delayed correlation property may not hold on this mixed signal. Therefore, it is important to filter out unwanted signals in channels that are not used by the transmitter so that the preamble detection can be successful on a clean signal.

As shown in FIG. 5, once the transmitter wins a narrow channel, it uses all subcarriers in the channel for the receiver's signature. The receiver learns that there is an incoming transmission through high correlation peaks of its signature. These correlation peaks also indicate the channels used by the transmitter. The arbitration phase ends when collisions in all narrow channels are resolved. One more OFDM symbol is used as the spectrum agreement so that the transmitter can inform the receiver of the last gained channel. After the spectrum agreement, the transmitter transmits a reserved ZC sequence in all gained channels to indicate the end of the arbitration. If the receiver gets a high correlation value for this end-of-arbitration signaling, it starts to filter out signals that are not in channels used by the transmitter. This allows the receiver to detect the OFDM synchronization preamble and then it follows the standard OFDM transmission.

As discussed before, the node can monitor the medium state even during transmission as long as the ADC is not saturated. Therefore, when new channels become available, the node performs the medium access procedure in new channels without interrupting the current transmission. Since the receiver filters out signals that are not in currently used channels. Even if the transmitter is sending some symbols in other channels for contention, the current reception will not be affected. When the transmitter wins some other channels, it inserts a control message in the current data transmission. The control message specifies the new spectrum use. The receiver then changes to receive data in a wider bonded channel.

Figure 8:
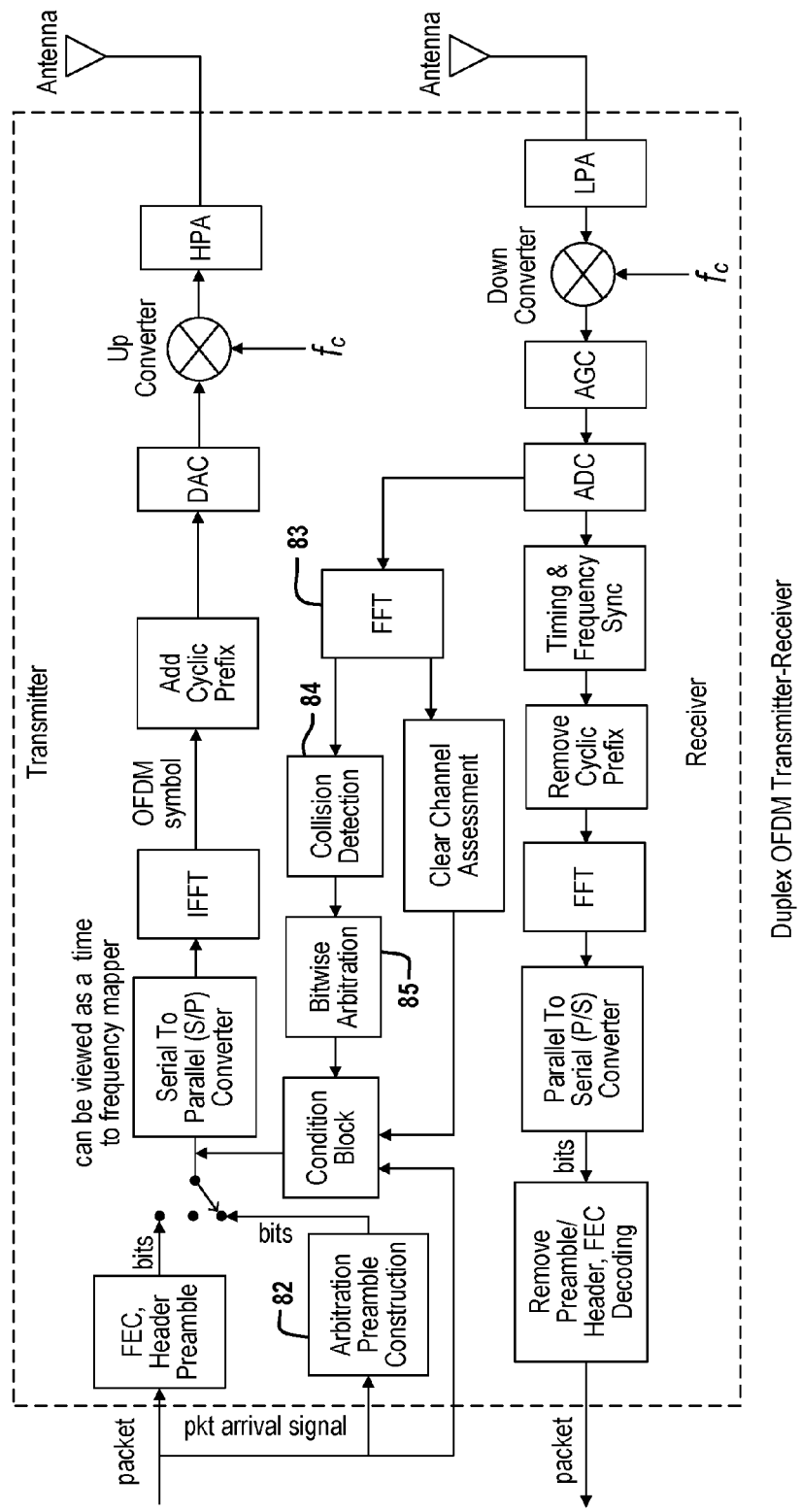
FIG. 8 is a block diagram illustrating how the dynamic channel bonding technique can be integrated into the architecture of a typical wireless communication device.

FIG. 8 illustrates how the dynamic channel bonding technique described above can be integrated into the architecture of a typical wireless communication device. Before initiating data transmission, the device enters a collision detection phase. During the collision detection phase, a collision probe is constructed by the preamble construction module indicated at 82. In one embodiment, this function is implemented by computer-readable instructions executed by a computer processor residing in the device. The term module may also refer to, be part of, or include an electronic circuit, an Application Specific Integrated Circuit (ASIC), a combinational logic circuit, and/or other suitable components that provide the described functionality. The collision probe can then be transmitted in the manner described above.

During the transmission, an incoming signal is demodulated, for example using a fast Fourier transform at 83. During the collision detection phase, the incoming data signal is compared to the bit values of the collision probe by the collision detection module 84. In this way, a collision can be detected by the device prior to initiating data transmission. During the arbitration phase, bitwise arbitration is carried out by the bitwise arbitration module 85. In either case, these functions can be implemented by computer-readable instructions executed by a computer processor residing in the device. The term module may also refer to, be part of, or include an electronic circuit, an Application Specific Integrated Circuit (ASIC), a combinational logic circuit, and/or other suitable components that provide the described functionality. Other architecture arrangements also fall within the broader aspects of this disclosure.

Dynamic channel bonding was evaluated in both GNU Radio experiments and simulations. The first step is to evaluate the collision detection and bitwise arbitration and compare them with CSMA/CA to demonstrate that the bitwise arbitration is more efficient in medium access contention. The spectrum agreement design is then evaluated, verifying that the receiver can be informed of used channels through partial spectrum correlation. Finally, the performance of the dynamic channel bonding method is evaluated using simulations over various network configurations.

There is a delay up to hundreds of microseconds between GNU Radio and USRP platforms as measured in some studies. The difference between bitwise arbitration and random backoff is hardly seen if the system delay dominates the total delay. Therefore, the collision detection and bitwise arbitration can be implemented in Verilog/VHDL on the FPGA of USRP E110. Because packet encoding and decoding are more complex, they are implemented in GNU Radio. A packet is buffered on FPGA before transmission. Due to the limited FPGA resources, the packet size is set to 100 bytes and the modulation scheme is BPSK.

To obtain full duplex wireless communication, the WBX transceiver is used, which has independent local oscillators (LOs) for transmitting and receiving chains. To reduce self-interference, the transmitting and receiving antennas are separated by about 2 feet. The performance of collision detection will be improved with better self-interference cancellation techniques.

Figure 9:
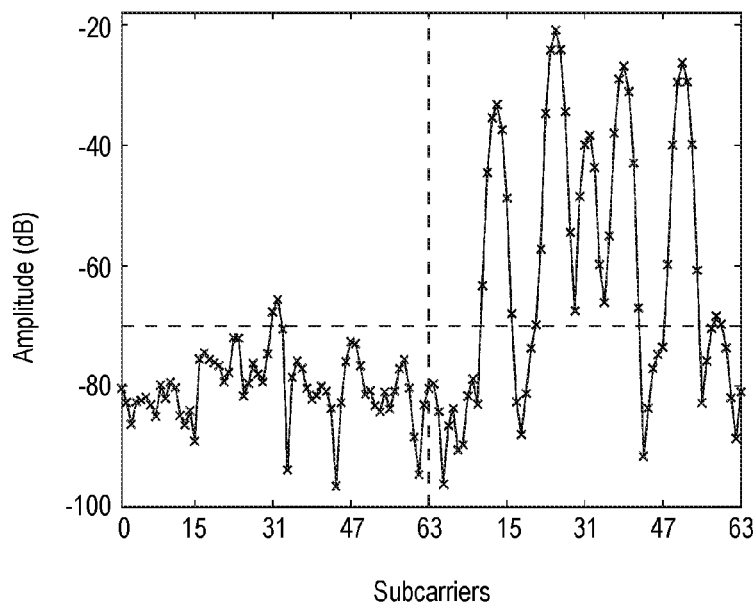
FIG. 9 is a graph illustrating result of performing 64 point FFT on a received signal.

When a node is transmitting the compound preamble, it should not falsely detect noises as collisions; otherwise it may defer its transmission unnecessarily. One USRP E110 is set to the full duplex mode. FIG. 9 shows that when the node is transmitting, the noise floor is increased. If a node measures the noise floor during the interval when there is no transmission and uses the noise floor to determine whether there is a signal at a subcarrier, it may incorrectly regard that there is a collision. To reduce false alarm rate, the noise threshold is increased.

Figure 10:
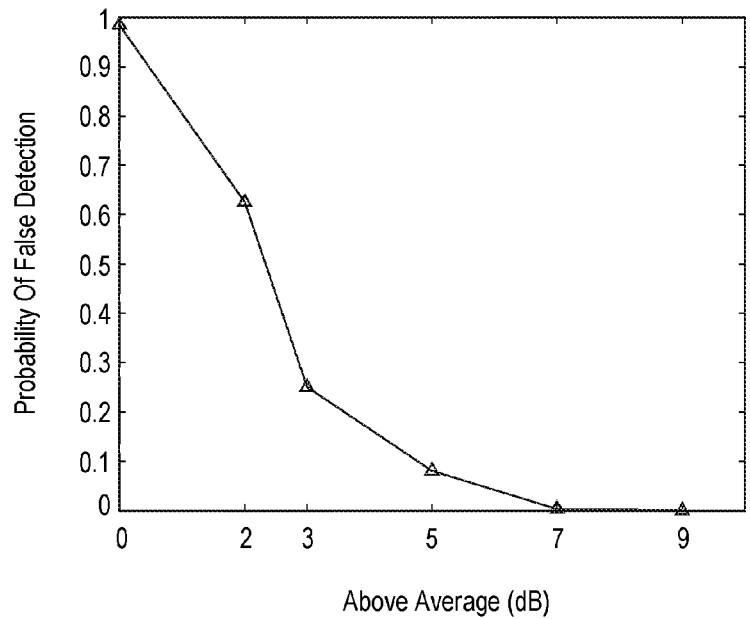
FIG. 10 is a graph illustrating the false collision detection rate for dynamic channel bonding.

A node first measures the noise floor when the channel is idle. FIG. 9 shows that there is a DC offset at the middle of the spectrum in USPR. If the DC offset has the highest magnitude, the channel is regarded as being idle. When only one node is transmitting, it should not identify inactive subcarriers as active. The noise threshold x dB is set above the measured noise floor. A subcarrier is considered active if its magnitude is above the threshold. The false collision detection rate is presented in FIG. 10. If the noise threshold is increased by 7 dB from the measured noise floor, the probability of mistaking an inactive subcarrier as active is low enough.

Figure 11:
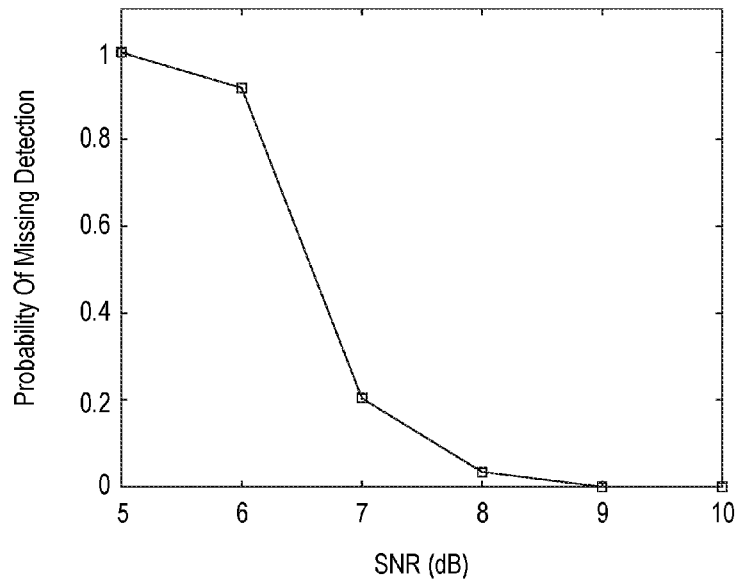
FIG. 11 is a graph illustrating collision detection performance for dynamic channel bonding.

Once the noise threshold is determined, whether a node can detect the collision from a weak signal is studied. Turn on another USRP E110 and gradually increase the transmission power. FIG. 11 shows that a node is unlikely to miss the detection of another node's compound preamble if the SNR is above 9 dB. The 802.11 standard requires that the minimum modulation and coding rate sensitivity for OFDM PHY at 20 MHz is −82 dBm. With a typical noise floor at −95 dBm, the compound preamble detection range is larger than the communication range.

The unique frequency feature of the compound preamble accounts for the easy detection. Normally, when two transmissions collide, the weak signal is buried under the strong signal. However, when two compound preamble transmissions collide, they do not affect each other because they use different subcarriers. As long as the SNR is above 9 dB, a collision is detectable. If two nodes use the same subcarriers, the aggregated power increases the collision detection probability at a third node. A collision is undetectable only if two nodes choose the same binary code, but the probability is reduced exponentially with the length of the binary code.

Figure 12:
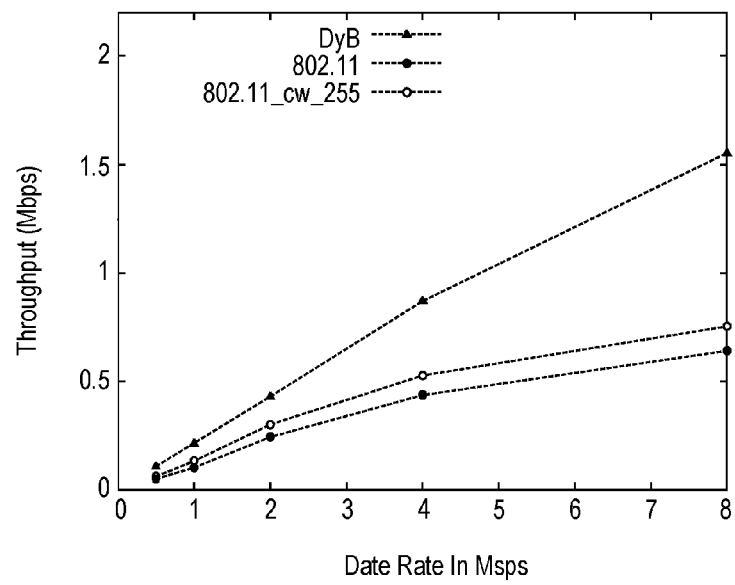
FIG. 12 is a graph illustrating throughput gain of dynamic channel bonding over 802.11.

The bitwise arbitration reduces the medium access overhead, leading to higher throughput. Three USRP E110 keep sending packets to a E110. Each E110 has two ADCs of a sampling rate at 64 Mega samples per second (Msps). Because the decimation rate can be set to multiples of 2, the throughput at data rates of 0.5, 1, 2, 4, and 8 Msps is evaluated. To compare with CSMA/CA, the parameters defined in 802.11.n are used. FIG. 12 shows the improvement of the dynamic channel bonding method over 802.11n.

A 64 point IFFT/FFT algorithm was implemented on FPGA of USRP E110. There are [64/6]=10 subcarriers available for medium access contention. Because the middle part is affected by the DC offset, only 4 subcarriers are used at each side of the DC offset for medium access contention. With 8 subcarriers, the collision probability in bitwise arbitration is $$C(n, 2) * \left(\frac{1}{2^8 - 1}\right)^2 = C(n, 2) * \left(\frac{1}{255}\right)^2.$$

On the contrary, in CSMA/CA the collision probability may be high with the small initial CW. To obtain the same low collision probability, 802.11 needs a fixed CW size of 255. FIG. 12 shows that the throughput of 802.11 is improved a little bit with the larger contention window, but the throughput is still lower than dynamic channel bonding because the average backoff time is increased with a larger contention window.

The throughput improvement of dynamic channel bonding over 802.11 is more significant at high speeds as shown in FIG. 12. At high speeds, the medium access contention is a large portion of a transmission where the actual data transmission is completed in a short time. The overhead of medium access contention in 802.11 is variable to the physical layer (PHY) data rate. The throughput is thus constrained by the medium access overhead. On the contrary, in the bitwise arbitration, the time used to collect samples is reduced with higher data rates. The collision and bitwise arbitration is upper bounded by (1+k) FFT frames when k bit binary codes are used for medium access contention. Suppose each FFT frame consumes a vector of 64 samples. When the data rate is 4 Msps, each FFT frame takes 16 μs. When the data rate is increased to 8 Msps, each FFT frame takes only 8 μs. The channel access overhead is thus reduced with higher data rates. The high PHY data rate is translated to high throughput.

Figure 13:
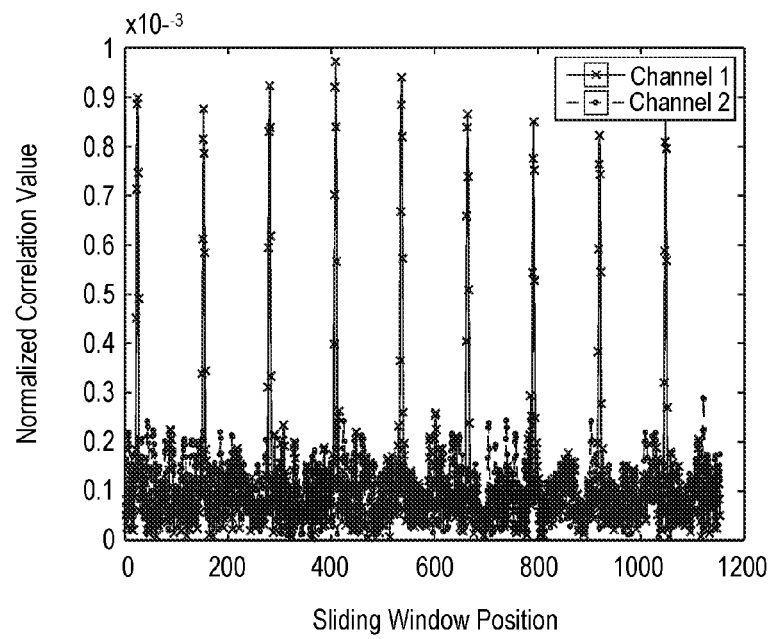
FIGS. 13 and 14 are graphs illustrating correlation results for a receiver.
Figure 14:
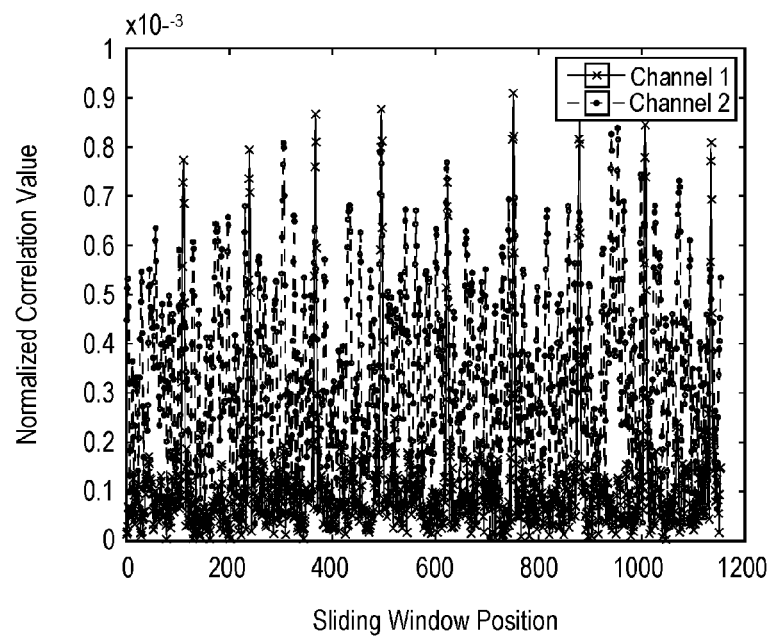
Figure 15:
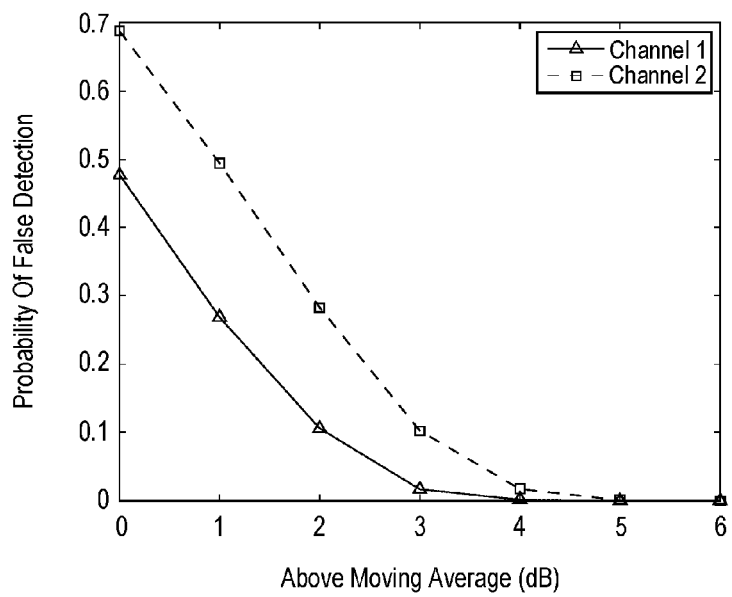
FIG. 15 is a graph illustrating the false collision detection rate at different thresholds.

Once a node wins some narrow channels, it needs to inform the receiver of occupied channels. To validate the effectiveness of partial spectrum correlation, 128 point IFFT/FFT is used on a band of 4 MHz. The band is divided into four channels of 1 MHz and each contains 32 subcarriers. The transmitter encodes the receiver's signature in channel 1 and 3. FIG. 13 shows the correlation results when the receiver expects its signature to be present in channel 1 and channel 2. Because the receiver's signature is indeed present in channel 1, each time the sliding window is aligned with the signature, the receiver identifies a correlation peak. On the contrary, the receiver's signature is not encoded in channel 2. There is no significant correlation peak. Experiments prove that although the time domain samples are the sum of all modulate subcarriers, the receiver is still able to identify whether a subset of subcarriers are modulated with a known sequence The partial spectrum correlation takes all signals in the entire band for process. FIG. 14 shows that although the transmitter does not encode the receiver's signature in channel 2, the correlation value is high when the interference transmission in channel 2 is strong. This is because the correlation value $C(s, y)=\Sigma_{k=1}^{L}s^*[k]y[k]$ is also related to the received energy of y[k]. When the interference transmission is strong, the correlation value is increased but no obvious pulse is present. To detect a real peak in correlation, calculate the moving average while performing the correlation. A threshold that is x dB above the moving average is used to determine whether a real peak occurs. FIG. 15 shows that 5 dB can exclude false detections of correlation peaks.

Figure 16:
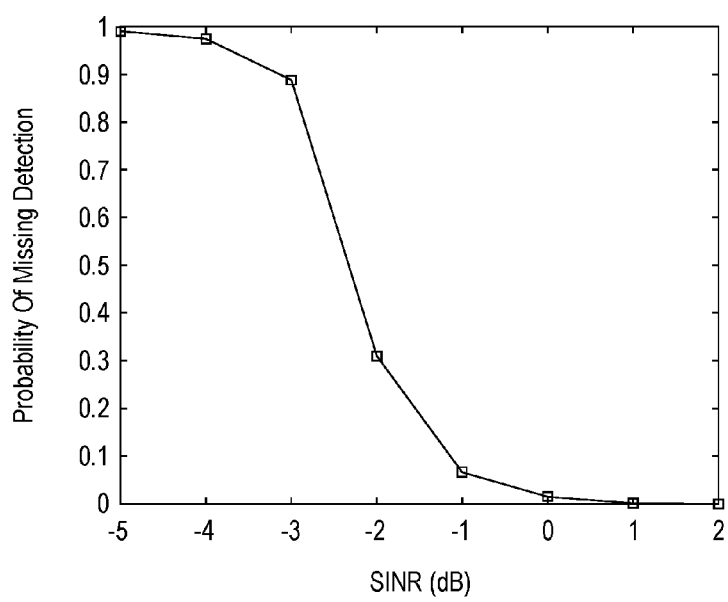
FIG. 16 is a graph illustrating collision detection performance for dynamic channel bonding.

With the threshold discovered above, the required SINR for detecting the correlation peaks is checked. The transmitter's transmission power is reduced to obtain the desired SINR. Each experiment checks the number of missed detections in 1000 compound preambles. An accurate detection should indicate that both channel 1 and channel 3 are used. FIG. 16 shows that the detection of used channels is reliable even at low SINR. Note that the transmitter has won these channels in bitwise arbitration phase, the interference from other nodes is expected to be low.

The performance of dynamic channel bonding is evaluated using simulations in ns-2.35. A scenario is simulated where several pairs of nodes contend for a band of 40 MHz and the band is divided into 8 channels of 5 MHz. With one antenna, the maximum data rate is 135 Mbps using 64-QAM modulation and 5/6 coding rate as indicated in 802.11 standard. To study the difference between bitwise arbitration and random backoff, narrow channel interferers are not added at the beginning. The number of wide band transmitters is increased from 1 to 30. All transmitters generate fully backlogged CBR traffic with packet size of 1500 bytes.

Figure 17:
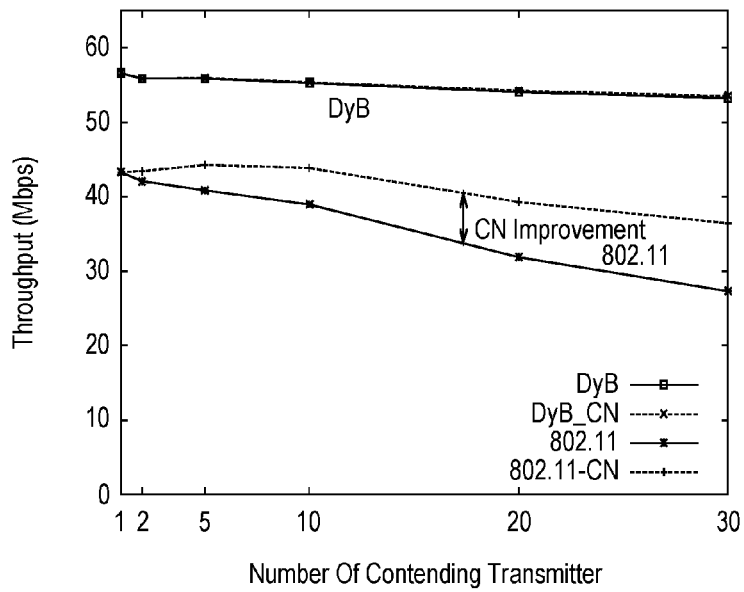
FIG. 17 is a graph illustrating throughput for different contending transmitters.

FIG. 17 shows the throughput gain of dynamic channel bonding over 802.11. If there is only one pair of nodes, the transmitter can transmit immediately after collision probe in the dynamic channel bonding method. Performing 128 point FFT needs 128 samples per frame. It takes 3.2 μs to collect 128 samples at 40 MHz. The channel access overhead is a duration of 3.2 μs. In 802.11, the average channel access backoff is 7.5×9 μs=67.5 μs with the initial contention window. The difference in channel access overhead leads to the difference in throughput.

When more nodes are contending for medium access opportunities, collisions and enlarged contention windows contribute to the throughput loss in 802.11. A node can infer a collision only after it completes the transmission. To enhance 802.11, the collision notification (CN) mechanism introduced in [15] is implemented. Assume an ideal case where a collision can be detected and notified whenever it happens. FIG. 17 shows that CN improves the throughput of 802.11 by a lot but has a marginal improvement over dynamic channel bonding. The result shows that the number of collisions in DyB is few due to the binary mapping in frequency domain and efficient bitwise arbitration.

Figure 18:
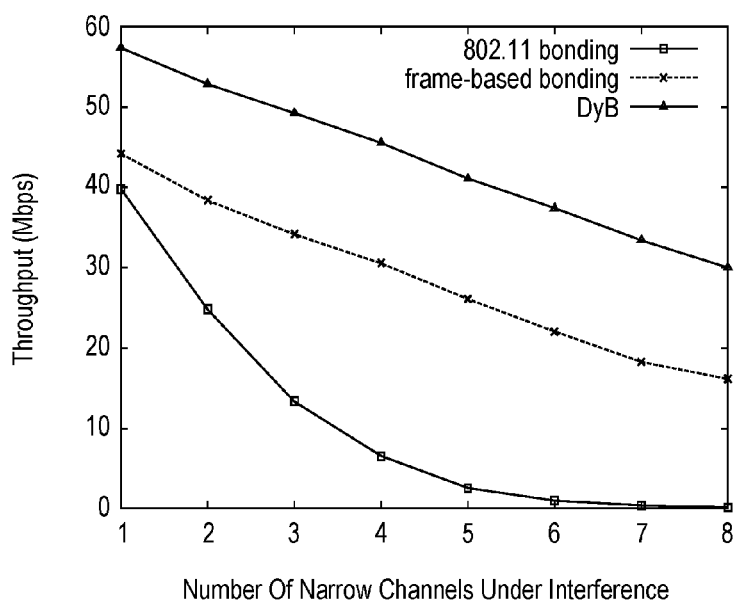
FIGS. 18 and 19 are graphs illustrating throughput of a wide band device.

When all nodes have the same channel width, they have equal chance to win channel access. When some nodes change to use narrow channels, they get more channel access opportunities. To study the impact of narrow channel interference, narrow channel interferers are added to the 8 channels one by one. Because narrow channel interferers work independently in the 8 channels, they are likely to win channel access as they do not contend with devices in other channels. On the contrary, a wide band device in 802.11 channel bonding has to contend with all narrow channel interferers. If any channel is occupied, the wide band device cannot transmit. As shown in FIG. 18, when all eight narrow channels are occupied by interferers, the wide band device nearly has no chance to transmit.

In frame-based channel bonding, a wide band device keeps counting down the random number as long as one channel is available. When the random backoff is completed, the wide band device transmits in all channels that are still idle. FIG. 18 shows that the method makes a wide band device be able to survive in a network where many uncoordinated narrow channel interferers exist. The spectrum resource, however, is not fully exploited. Dynamic channel bonding lets a wide band device monitor the state of the entire band even when the device is transmitting. Whenever a channel becomes available, the wide band device will participate in the contention and it may win the channel for bonding. In joint with the efficient parallel bitwise arbitration, the throughput of channel bonding is further improved even under the severe narrow channel interferences.

Figure 19:
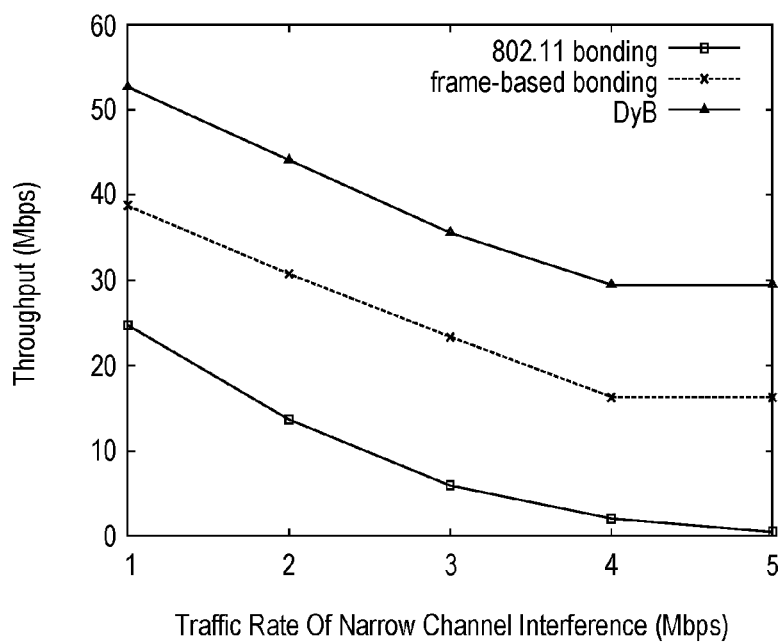

When there exist narrow channel interferers in all eight narrow channels, the 802.11 channel bonding can still provide service if the narrow channel interferers are not very active as shown in FIG. 19. However, if narrow channel interferers always have data to send, the wide band device can hardly observe a gap when all narrow channels are idle. Dynamic channel bonding allows a wide band device to initiate transmission as long as one channel is available. The chance to deliver a packet is higher. Dynamic channel bonding also bonds other channels whenever they become idle. The throughput is thus higher than frame-based channel bonding where new channels can be used only in the next frame.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A method for dynamic channel bonding in a multicarrier wireless network, comprising:
    (a) determining, by a first communication device, whether channels in a plurality of channels of a shared transmission medium are available for transmission, where each channel of the plurality of channels is divided into a plurality of subcarrier frequencies;
    (b) transmitting, by the first communication device, a collision probe in each available channel of the plurality of channels, where the collision probe is derived from a binary codeword of k bits and each bit of the binary codeword is transmitted using a different subcarrier of the channel;
    (c) detecting, by the first communication device, a collision on available channels based on presence of a signal on a subcarrier frequency of the available channel whose corresponding bit value in the collision probe is zero;
    (d) arbitrating, by the first communication device, access to a given available channel in response to detecting a collision on the given available channel;
    (e) transmitting, by the first communication device, data over the given available channel; and
    repeating, by the first communication device, steps (a)-(e) while transmitting data over the given available channel.

2. The method of claim 1 further comprises generating a collision probe by selecting a random number from a range of values; and translating the random number to the binary codeword using a binary code, where a bit value of one correlates to a signal magnitude greater than zero, a bit value of zero correlates to a signal magnitude of zero and k is the number of subcarrier frequencies.

3. The method of claim 2 further comprises selecting a different random number for each available channel.

4. The method of claim 1 wherein transmitting the collision probe further comprises
modulating each of the plurality of subcarriers frequencies in a given channel with a different bit from the binary codeword using inverse fast Fourier transform.

5. The method of claim 1 further comprises receiving, by the first communication device, an incoming signal from a second communication device, the incoming signal received via one of the available channels.

6. The method of claim 5 further comprises transmitting the collision probe via an antenna associated with the first communication device and receiving the incoming signal via the same antenna using self-interference cancellation.

7. The method of claim 5 wherein detecting a collision on a given channel of the available channels further comprises
demodulating each of the subcarrier frequencies of a given channel in the incoming signal into a bit value of a binary codeword;
comparing the bit values from the incoming signal to the bit values of the collision probe for corresponding channel; and
identifying a collision on the given channel when a bit value from the incoming signal is one and the corresponding bit value of the collision probe for the corresponding channel is zero.

8. The method of claim 7 wherein arbitrating access further comprises
(f) selecting, by the first communication device, one bit value from the binary codeword, where the bit value is selected from the binary codeword in a predefined order;
(g) pausing, by the first communication device, transmission over the given channel for a period of time when the selected bit value is zero;
(h) retransmitting, by the first communication device, the collision probe over the given channel during the period of time when the selected bit value is one; and
(i) listening, by the first communication device, for a signal on the given channel during the period of time.

9. The method of claim 8 further comprises:
(j) receiving, by the first communication device, a second signal over the given channel from the second communication device;
(k) determining, by the first communication device, a match between the selected bit value and a corresponding bit in the received second signal;
(l) selecting, by the first communication device, another bit value from the binary codeword and repeating steps (g)-(l), where the selection of another bit is in response to determining a match and the another bit value is selected from the binary codeword in the predefined order.

10. The method of claim 9 further comprises
initiating, by the first communication device, transmission over the given channel when the selected bit value is one and a signal is not received via the given channel by the first communication device.

11. The method of claim 10 further comprises
aborting, by the first communication device, transmission over the given channel when the selected bit value is zero and a signal is received via the given channel by the first communication device.

12. The method of claim 1 further comprises transmitting, by the first communication device, a signature for a recipient device prior to transmitting the data over the given channel, where the signature is a unique pseudo-random sequence assigned to the recipient device.

13. A method for dynamic channel bonding in a multi-carrier wireless network, comprising:
determining, by a first communication device, a signature for an intended recipient device, where the signature is a unique pseudo-random sequence assigned to the intended recipient device;
arbitrating, by the first communication device, access to a plurality of channels of a shared transmission medium available for transmission, where each channel of the plurality of channels is divided into a plurality of subcarrier frequencies;
obtaining access, by the first communication device, to select channels of the plurality of channel as a result of arbitrating access to the plurality of channels;
transmitting, by the first communication device, a signature for a recipient device by modulating subcarriers frequencies of the selected channels in the plurality of channels using bits of the signature while modulating subcarrier frequencies of unselected channels in the plurality of channels with zero.

14. The method of claim 13 further comprises modulating subcarriers frequencies using inverse fast Fourier transform.

15. The method of claim 13 further comprises receiving, by the intended recipient device, a signal on the shared transmission medium, and correlating the signal with the signature known to the intended recipient device.

16. The method of claim 13 wherein arbitrating access further comprises
(m) determining, by the first communication device, whether channels in the plurality of channels are available for transmission;
(n) transmitting, by the first communication device, a collision probe in each available channel of the plurality of channels, where the collision probe is derived from a binary codeword of k bits and each bit of the binary codeword is transmitted using a different subcarrier of the channel; and
(o) detecting, by the first communication device, a collision on any of the available channels based on presence of a signal on a subcarrier frequency of the available channel whose corresponding bit value in the collision probe is zero;
(p) transmitting, by the first communication device, data over the given available channel; and repeating, by the first communication device, steps (m)-(p) while transmitting data over the given available channel.

17. The method of claim 16 further comprises generating a collision probe by selecting a random number from a range of values; and translating the random number to the binary codeword using a binary code, where a bit value of one correlates to a signal magnitude greater than zero, a bit value of zero correlates to a signal magnitude of zero and k is the number of subcarrier frequencies.

* * * * *